2,973,050
MOTOR VEHICLE THROTTLE LOCK

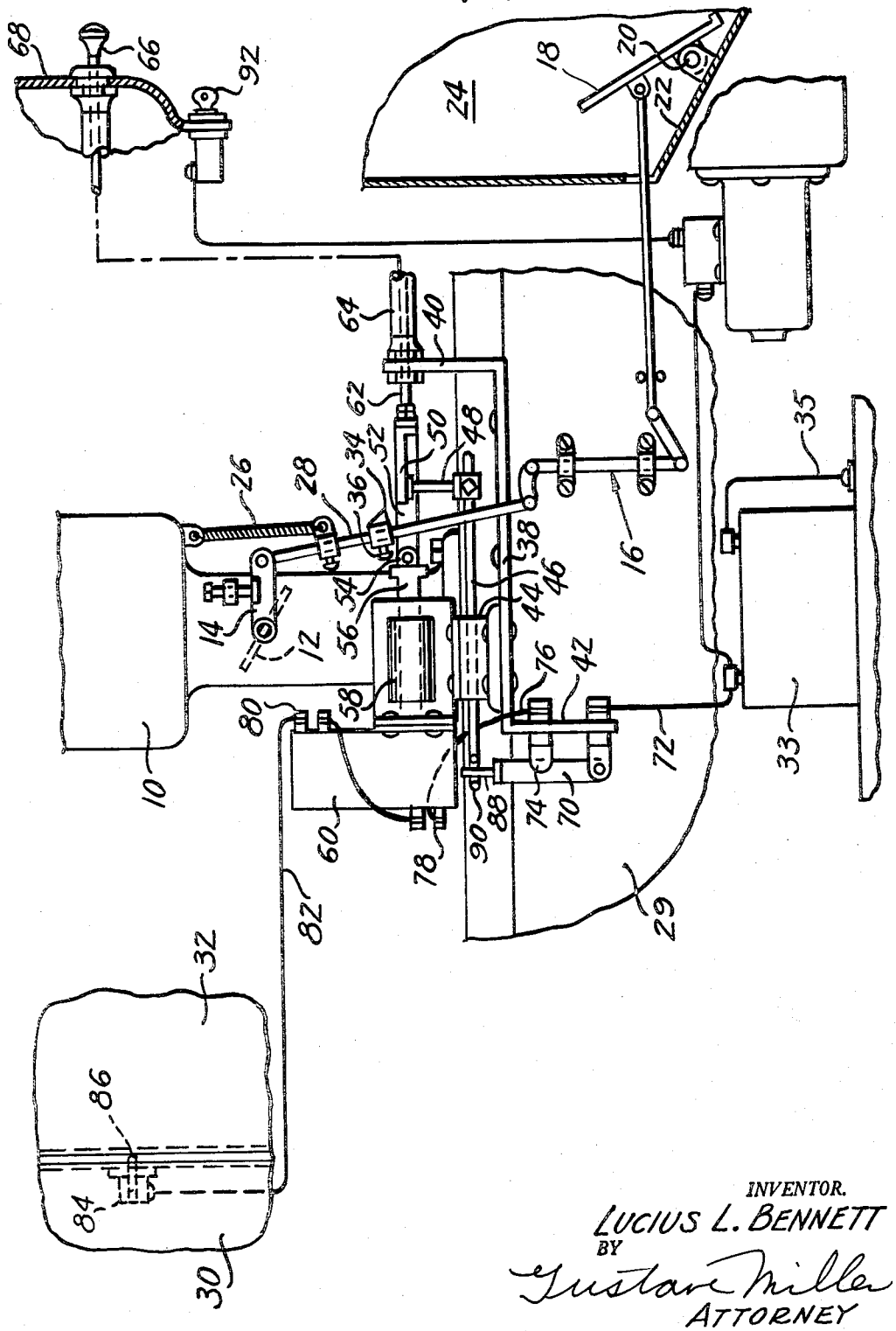

Lucius L. Bennett, 984 SW. 4th St., Miami 36, Fla.

Filed July 16, 1959, Ser. No. 827,621

7 Claims. (Cl. 180—82)

This invention relates to a motor vehicle throttle lock and has for an object to provide a throttle lock for locking the throttle and thus preventing acceleration of the motor of a motor vehicle while a door to the motor vehicle is in open position.

A further object of this invention is to provide means for automatically locking the throttle, thus preventing the motor from being accelerated so long as a door of the motor vehicle is thus in open position.

A further object of this invention is to provide a throttle lock which can be easily added to any existing motor vehicle by suitably adding the appropriate parts to the linkage between the foot throttle and the carburetor valve, and to the various doors of the motor vehicle, so that opening any door which is connected to this invention will automatically lock the throttle against accelerating the vehicle, thus making it impossible for the driver to unknowingly start up and accelerate the vehicle while the door is open, as when a passenger is entering or leaving the vehicle.

Still another object of this invention is to provide a means for locking the throttle against accelerating the motor of a vehicle as long as the door is open, and which will remain in locked position, without draining the vehicle's electrical battery.

Still a further object of this invention is to provide a throttle lock which is automatically actuated to locking position by the act of opening the vehicle door, which simultaneously interrupts the activating circuit so as to prevent any further draining on the battery, and which must be manually activated to non-locking position, preferably by a control convenient to the motor operator, before the vehicle motor can be accelerated, and which motor can be accelerated only provided the motor vehicle doors have been replaced to closed position.

In brief, this invention comprises a circuit actuated by a switch released by opening the door through a relay to operate a solenoid which moves an obstruction into the path of the linkage between the foot throttle and the carburetor valve, and connected to the obstruction means is a circuit interrupting switch for interrupting the circuit through the relay when the obstruction is in obstructing position, and also includes a manual connection to the obstruction convenient to the driver so that when the doors have been reclosed, he can remove the obstruction from throttle obstructing position and be in a position to start up and operate the motor of the vehicle.

With the above and related objects in view, this invention consists in the details of construction and combination of parts, as will be more fully understood from the following description, when read in conjunction with the accompanying drawing, in which:

The figure is a schematic view showing the invention in operative position on a motor vehicle.

There is shown at 10 a conventional carburetor mounted in the engine compartment of a motor vehicle and having a conventional control valve 12 connected to a valve lever 14 and operable by conventional linkage 16 from a pedal or foot throttle 18 pivoted in the conventional manner as at 20 on the floor 22 of the driver compartment 24.

The usual spring 26 is connected to the linkage 16 for restoring the valve 12 to idle position in the usual manner. The structure thus far described is all conventional and, obviously, may vary in detail in different motor vehicles, although the operating principle remains the same. As here shown, the particular link 28 of linkage 16 is moved in a generally downward direction whenever the foot pedal or throttle 18 is depressed to accelerate the motor of the vehicle. The motor shown at 29 generally provides supporting means for the linkage 16 and the carburetor 10. There is also shown at 30 a door post of the body, to which a door 32 is conventionally hinged. A conventional source of electricity consisting of the battery 33 is also mounted in the conventional manner in the motor compartment and is grounded, as at 35, in the conventional manner.

Without this invention, the vehicle motor may be accelerated in the normal manner by depressing the throttle 18 irrespective of whether the door 32 is in open or closed position, but with this invention, opening the door 32 makes it impossible to depress the throttle 18. This invention includes an obstruction member consisting of a lock block 34 clamped on the throttle link 28 by any suitable means such as a set screw 36.

Suitably mounted on the motor 29 is a base plate 38 having an upstanding arm 40 at one end and a depending leg 42 at the other end. Mounted on the base plate 38 is a sleeve 44 slidably supporting a slide bar 46. Secured on one end of slide bar 46 is an upstanding arm 48 to which is secured a lock head or obstruction member 50.

The lock plate of obstruction member 50 is also secured to an arm 52 extending from the end 54 of the armature 56 of a solenoid 58, the solenoid 58 being rigidly mounted together with a relay 60 in a suitable manner on the motor 29. Also connected to the lock head 50 is a cable 62 extending through a suitable sleeve 64 and terminating in a control button 66 within the driver's compartment of the motor vehicle and extended through the instrument board 68.

Mounted on the other end of the base plate 38, on the depending leg 42 is a knife switch 70 for completing a circuit from the battery 33 through a connection 72 through a contact 74 and thus through a conductor 76 to the relay 60 as at 78. The relay 60 is, in turn, connected at 80 through the conductor 82 to a switch 84 mounted in the door post 30. This switch 84 is substantially identical with the conventional door light switches found in many motor vehicle bodies wherein the switch 84 remains in dead or inactive position so long as its plunger 86 is held in position by the door 32 being closed, but when the door 32 is opened, the spring-pressed plunger 86 moves out to complete the circuit through the switch 84 and thus through the conductor 82 to the relay 60. The relay 60 connected in circuit through the knife switch 70 actuates the solenoid 58 to cause the armature 56 to be drawn therewithin, thus simultaneously moving the lock plate 50 to engage the lock block 34 mounted on throttle link 28, thus preventing the throttle from being actuated while in this position. Simultaneously the slide bar 46 moves to the left as shown, thus moving the knife switch 70 to circuit interrupting position as the knife switch handle 88 is pushed by the end 90 of slide bar 46 to circuit interrupting position simultaneously with the movement of the lock plate 50 to locking position beneath the lock block 34. Thus, the throttle is locked against being moved to accelerate the motor as soon as the door 32 is opened, and by placing switches 84 in the door post of each door to the vehicle, the throttle will be locked when any door of the vehicle is opened. Also, while the throttle is locked, the circuit for actuating the same through the knife switch 70 has been interrupted so that the battery 33 will not be depleted and no current will be drawn by the relay or the solenoid. The motor cannot be accelerated, even though the door is closed again, until the lock plate 50 is removed from beneath the lock block 34, and this is done by the vehicle operator by pulling on the button 66 and thus through the cable 62, withdrawing the lock plate 50 from beneath the lock block 34. This, simultaneously, through the slide bar 46, places the knife switch in circuit completing position when the door 32 is again opened. Thus, it will be impossible to accelerate the motor as long as the door is open, for opening the door will immediately again move the lock plate 50 to locking position beneath lock block 34 on throttle link 28.

It will be noted, moreover, that the lock deactivating button 66 is located conveniently close to the motor ignition lock 92 so that it will be just as convenient for the operator to unlock his throttle as it will be to unlock the ignition switch.

Thus, with this invention, which can be installed on any conventional motor vehicle, the throttle must be unlocked by pulling control button 66 when all the doors are closed before the motor can be accelerated to move the vehicle, thus providing a substantial safety element and preventing moving the vehicle while passengers are alighting from or entering the vehicle.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

1. For use in a motor vehicle having a carburetor valve, a control throttle, a linkage connecting the valve to the throttle, and a source of electricity; a throttle lock automatically lockable while the vehicle door is in open position, said throttle lock comprising a circuit connected to said source of electricity activated by opening the vehicle door, means electrically activated by said circuit into control throttle locking position, and a circuit interrupting switch in said circuit operable to circuit interrupting position by movement of said control throttle locking means, said electrically activated throttle locking means comprising a solenoid mounted in said circuit, a lock block arranged to be suitably mounted on the throttle valve linkage, and a lock block locking means actuatable by said solenoid into locking position relative to said lock block.

2. The throttle lock of claim 1, and means for manually restoring said throttle locking means to unlocking position.

3. The throttle lock of claim 1, said circuit including a switch held in inactive position while the door is closed.

4. The throttle lock of claim 1, said circuit interrupting switch being simultaneously operable by said solenoid to circuit interrupting position to avoid depleting the source of electricity.

5. The throttle lock of claim 3, and a relay, said throttle locking means being operable through said relay by said solenoid to locking position.

6. The throttle lock of claim 5, and manually operable unlocking means for moving said throttle locking means from locking position to unlocking position.

7. The throttle lock of claim 6, said circuit interrupting switch being connected to said unlocking means for movement to circuit completing position.

References Cited in the file of this patent

UNITED STATES PATENTS

| | | |
|---|---|---|
| 1,302,101 | Taylor | Apr. 29, 1919 |
| 1,998,990 | Hasselbaum | Apr. 23, 1935 |
| 2,346,149 | Brewer | Apr. 11, 1944 |